D. A. RUNNION.
VALVE GRINDER.
APPLICATION FILED FEB. 8, 1919.
1,336,863.
Patented Apr. 13, 1920.
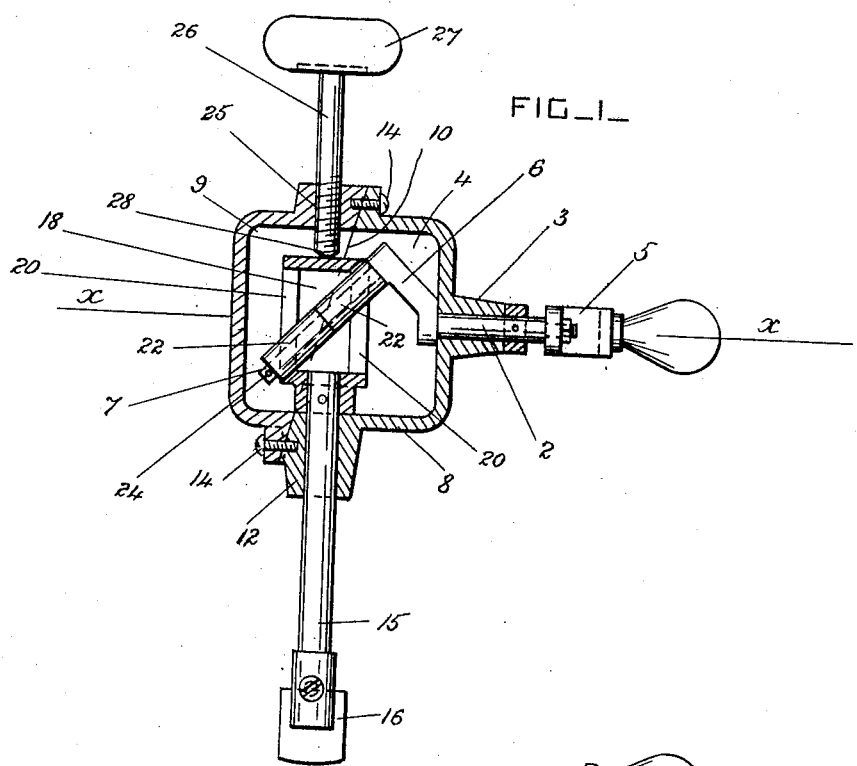
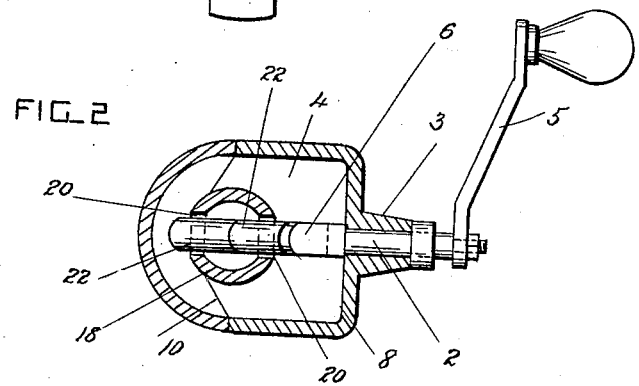
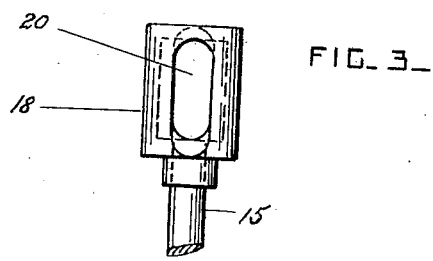
Inventor
David A. Runnion
by Herbert W. Jenner
Attorney.

UNITED STATES PATENT OFFICE.

DAVID A. RUNNION, OF FORTRESS MONROE, VIRGINIA.

VALVE-GRINDER.

1,336,863.

Specification of Letters Patent.

Patented Apr. 13, 1920.

Application filed February 8, 1919. Serial No. 275,726.

*To all whom it may concern:*

Be it known that I, DAVID A. RUNNION, a citizen of the United States, residing at Fortress Monroe, in the county of Elizabeth City and State of Virginia, have invented certain new and useful Improvements in Valve-Grinders, of which the following is a specification.

This invention relates to devices specially adapted for grinding valves and valve seats; and it consists in the novel construction and combination of the parts hereinafter fully described and claimed whereby the continuous rotary motion of the driving shaft is converted into an oscillatory intermittent motion of the driven shaft which engages with the valve or other object.

In the drawings, Figure 1 is a vertical section through a valve grinder constructed according to this invention. Fig. 2 is a plan view, taken in section on the line *x—x* in Fig. 1. Fig. 3 is a detail view of the slotted drum.

The driving shaft 2 is journaled in a bearing 3 on a supporting casing 4, and is revolved continuously by means of the crank 5 or other driving device which is secured to the shaft. The shaft 2 has a crank 6 secured on it and arranged inside the casing, and this crank is provided with a crank-pin 7 which is arranged obliquely and preferably at an angle of 45° with the shaft 2, and with the driven shaft.

The casing 4 is preferably formed of two parts 8 and 9 which are jointed together, and the joint 10 between the parts is preferably arranged diagonally of the driven shaft. The bearing 3 is formed on the part 8, and another bearing 12 is also formed on the part 8 and is arranged at a right angle to the bearing 3. By making these two bearings on the same part of the casing they are always preserved in their correct position relative to each other. The part 8 of the casing is secured to the part 9 by screws 14 or other suitable fastening devices which can easily be removed when desirable.

The driven shaft 15 is journaled in the bearing 12, and 16 is a blade secured to the projecting end portion of the shaft 15. This blade is used like a screwdriver to engage with a slot in the valve, but any other approved tool or device may be secured to the driven shaft according to the use to which the tool is put.

A drum 18 is secured on the driven shaft 15 inside the casing, and is slotted longitudinally. This drum is preferably hollow, and two longitudinal slots 20 are formed in its periphery. The crank-pin 7 is operatively connected with the slotted drum. The crank-pin is arranged in the slots 20, and antifriction rollers 22 are mounted on the crank-pin 7 so that one roller engages with one slot 20, and the other roller engages with the other slot. A pin 24 is inserted in the crank-pin to prevent the rollers 22 from sliding off it.

The other part 9 of the casing has a screwthreaded portion 25 arranged axially in line with the driven shaft, and 26 is a screwthreaded spindle which engages with the screwthreaded portion 25. A knob or handle 27 is secured on the outer end of the spindle 26, and its inner end 28 bears pivotally on the drum 18. The spindle 26 is used to adjust the position of the drum in the casing so that it may revolve freely, and the knob or handle is grasped by the operator so as to support the tool and press the valve toward its seat.

When the driving shaft is revolved continuously the crank-pin operates the driven shaft so that the driven shaft is oscillated back and forth through an angle of 90° for each revolution of the crank.

The rollers operate alternately to move the drum first in one direction and then in the reverse direction. The driven shaft is operated intermittently, and there is a pause between each stroke or travel. When the driven shaft commences to move, it starts slowly, then gradually increases in speed to the middle of its travel, then diminishes in speed to the end of its travel, and then is moved in a similar manner in the reverse direction.

This peculiar motion is of great value in grinding a valve to its seat. Abrasive material, such as emery, is sprinkled on the seat and the valve is oscillated in contact with the abrasive material until it acquires a good grinding fit with its seat. The crank handle may be revolved in either direction, and the device may be used for any other purpose to which the oscillating motion produced by it is applicable.

What I claim is:

1. In a valve grinder, a support, a driving shaft journaled therein, a driven shaft mounted to oscillate in the support and arranged at an angle to the driving shaft, a drum secured to the driven shaft and having two longitudinal bearing slots, arranged one at each side of it, a crank-pin secured to the driving shaft and arranged obliquely of the driven shaft, and separate rollers on the crank-pin for engaging with the respective slots of the drum.

2. In a valve grinder, a support, a driving shaft journaled therein, a driven shaft mounted to oscillate in the support and arranged at an angle to the driving shaft, an adjustable thrust spindle bearing axially on one end of the driven shaft, a crank-pin secured to the driving shaft and arranged obliquely of the driven shaft, and a slotted drum secured to the driven shaft and engaged by the said crank-pin.

3. In a valve grinder, a casing, a driving shaft journaled in the casing, a driven shaft mounted to oscillate in the casing and arranged at an angle to the driving shaft, a screwthreaded spindle engaging with the casing and bearing pivotally on one end of the slotted drum in line with its axis and provided with an operating knob or handle, and a crank secured on the driving shaft and provided with a crank-pin arranged obliquely of the driven shaft and operatively engaging with the said slotted drum.

4. In a valve grinder, a casing formed of separable parts, one of the said parts having two shaft bearings formed integrally with it and arranged at an angle to each other, a driving shaft journaled in one bearing, a driving shaft mounted to oscillate in the other bearing, a slotted drum secured on the driven shaft inside the casing, and a crank secured on the driving shaft inside the casing and provided with a crank-pin arranged obliquely of the driven shaft and operatively engaging with the said slotted drum.

In testimony whereof I have affixed my signature.

DAVID A. RUNNION.